(12) United States Patent
Blackwood et al.

(10) Patent No.: US 6,487,609 B1
(45) Date of Patent: Nov. 26, 2002

(54) METHOD AND SYSTEM FOR COMMUNICATING EVENT MESSAGES BETWEEN A PERIPHERAL DEVICE AND A CLIENT COMPUTER

(75) Inventors: Craig M. Blackwood, La Jolla, CA (US); Padmanabhan Ramchandran, San Diego, CA (US); David A. Kumpf, Rocklin, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/410,565

(22) Filed: Oct. 1, 1999

(51) Int. Cl.[7] ............... G06F 3/12; G06F 13/00; G06F 13/38
(52) U.S. Cl. .............. 710/8; 710/15; 710/18; 710/62; 710/72; 710/73
(58) Field of Search ............... 710/8, 15, 18, 710/62, 72, 73

(56) References Cited

U.S. PATENT DOCUMENTS 5,742,668 A * 4/1998 Pepe et al. ............. 379/88.22
5,768,119 A * 6/1998 Havekost et al. ............ 700/4
5,970,218 A * 10/1999 Mullin et al. ............ 358/1.15
6,085,249 A * 7/2000 Wang et al. .............. 709/203
6,091,508 A * 7/2000 Love et al. .............. 358/1.1
6,092,048 A * 7/2000 Nakaoka .................. 705/8

* cited by examiner

Primary Examiner—Jeffrey Gaffin
Assistant Examiner—Rehana Perveen

(57) ABSTRACT

A method and system for communicating an event message between at least one client operatively connected to a peripheral device, the peripheral device being adapted to execute an event when selected by a user or a client. The method includes maintaining a table of event descriptors in the peripheral device, selectively adding entries to the table in response to receiving a preselected add event descriptor request from a connected client, selectively deleting entries from the table in response to receiving a preselected delete event descriptor request from a connected client, and the user selecting an entry from said table of event descriptors for executing the selected event.

21 Claims, 6 Drawing Sheets

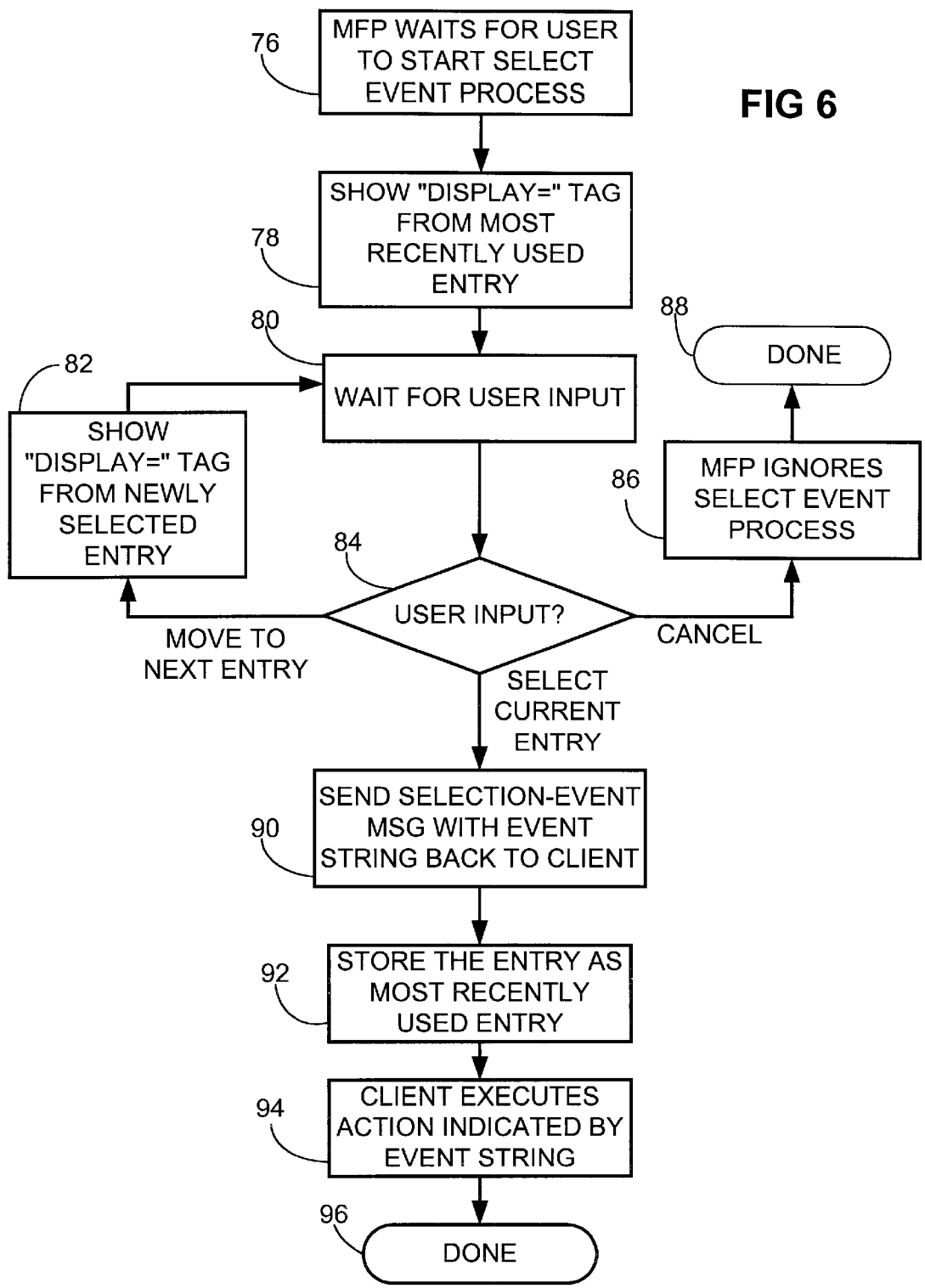

METHOD AND SYSTEM FOR COMMUNICATING EVENT MESSAGES BETWEEN A PERIPHERAL DEVICE AND A CLIENT COMPUTER

The present invention generally relates to a method for communicating an event message between one or more client computers operatively connected to a peripheral device, and more particularly to a method for adapting the peripheral device to execute an event when selected by a client computer or a user.

It is common for a number of client computers to be connected to more than one peripheral, such as a printer and/or a scanner. This arrangement allows a number of client computers to share the services of the printer and/or the scanner. Such client computers can be personal computers or other computers and will be referred to herein simply as a client. It is becoming more popular to use a multifunction peripheral (MFP) to combine the functions of these peripherals into a single peripheral. As a result, the use of the MFP devices are becoming more sophisticated, creating the need for more efficient communications between the MFP device and the clients.

One prior method of input peripheral event communication involved polling and sending simple button press notifications. However, polling was inefficient because it used the communication bandwidth constantly rather than only when needed. There was also a tradeoff between responsiveness and increased bandwidth use because a prompt response to the user would require frequent polling, which made other communication, such as scanning or printing, take longer.

Another approach has involved adapting the input peripheral to allow the user to select the destination, and then sending the input data directly to that client computer. Another problem involved with this approach was that the client computer often needed to perform various setup steps before it was ready to receive the data. Furthermore, it often needed additional user input to route the data to the desired destination. Although the input could be performed at the client computer, the user was still required to input data in two different places. Alternatively, the input could be performed at the peripheral, but this required the peripheral to know all possible actions that the client computer might want to take with the data, which made it very difficult to add new functions to client computer software because of the necessity to change the peripheral at the same time.

Accordingly, it is an object of the present invention to provide an improved method for more efficient communications of an event message between a peripheral device and a client connected to the network.

It is a further object of the present invention to provide an improved method in which the user is able to complete the entire input task at the peripheral device.

BRIEF SUMMARY OF THE INVENTION

The present invention provides a method for communicating an event message between one or more clients operatively connected to a peripheral device, and more particularly to a method for adapting the peripheral device to execute an event selected by a client or a user. The user can complete the entire input task at the peripheral device.

In accordance with this invention, there is provided a method for maintaining a table of event descriptors in the peripheral device, selectively adding entries to the table in response to receiving a preselected add event descriptor request from a connected client, selectively deleting entries from the table in response to receiving a preselected delete event descriptor request from a connected client, and consisting of a user selecting an entry from said table of event descriptors for executing the selected event.

Other objects, features and advantages will become apparent upon reading the following detailed description, in conjunction with the attached drawings, in which.

DETAILED DESCRIPTION OF THE INVENTION

Broadly stated, the present invention is directed to a method and system for communicating event messages between at least one client operatively connected to a peripheral device. The method allows the user to complete the entire input task at the peripheral device. The peripheral device is adapted to maintain a table of event descriptors, and is also adapted to add and delete entries in the table in response to a preselected event descriptor request from a connected client. In addition, the peripheral device is adapted to allow a connected client to download and upload entries onto the table. Lastly, the peripheral device is adapted to allow a user to select an entry from the table for executing the selected event.

Figure 1:
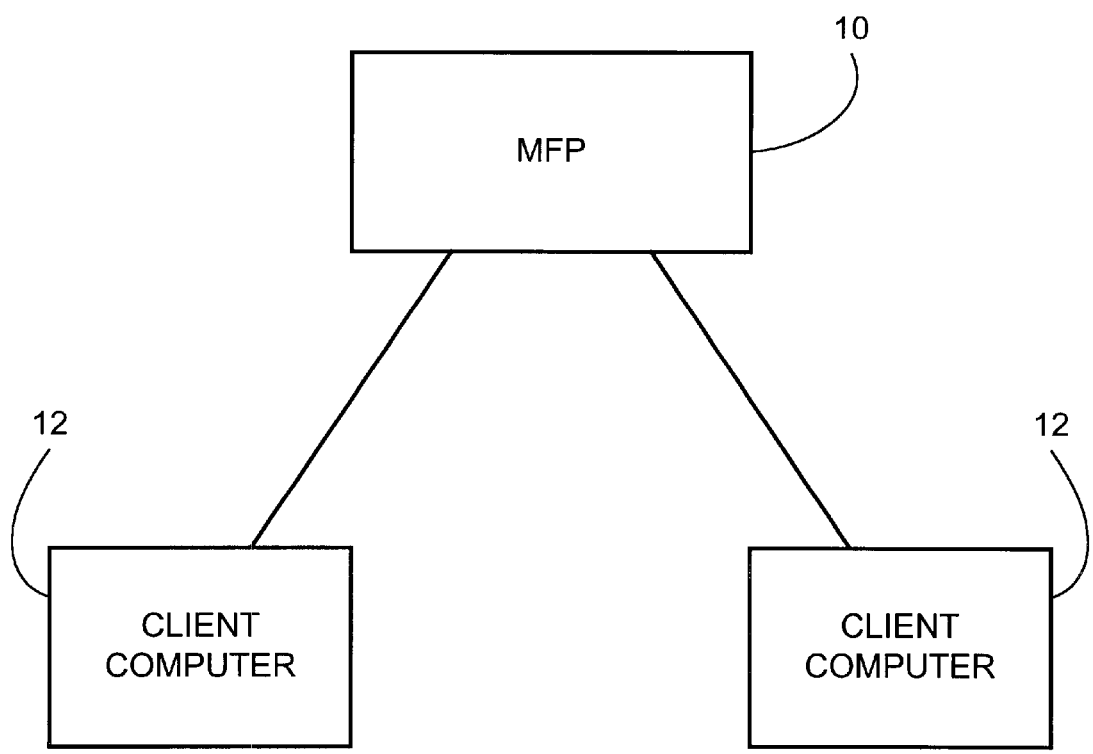
FIG. 1 is a schematic diagram of an input peripheral/client network architecture in which the present method is implemented.

Turning now to FIG. 1, a schematic diagram of an input peripheral/client network architecture is shown, and illustrates the way in which the client computers are connected for the implementation of the present invention. A peripheral device, such as a multifunction peripheral (MFP) 10, may be connected to a plurality of clients 12 (two shown) to exchange communications of event messages. The MFP 10 preferably maintains a table of event descriptors. This table of event descriptors is a list of entries from the clients 12, with each entry comprising a string of characters that constitutes a list of parameters that the clients 12 need to execute the event. Each parameter, separated with a semicolon character, is constructed as a keyword that names the parameter and an associated value defining the parameter. For example, an entry may have the following format: "KEYWORD1=value1; KEYWORD2=value2;". This format gives the clients 12 maximum flexibility because parameters of any length may be introduced without affecting the peripheral device. The only requirement is that the total string not exceed some reasonable maximum length set by the peripheral device.

Figure 2:
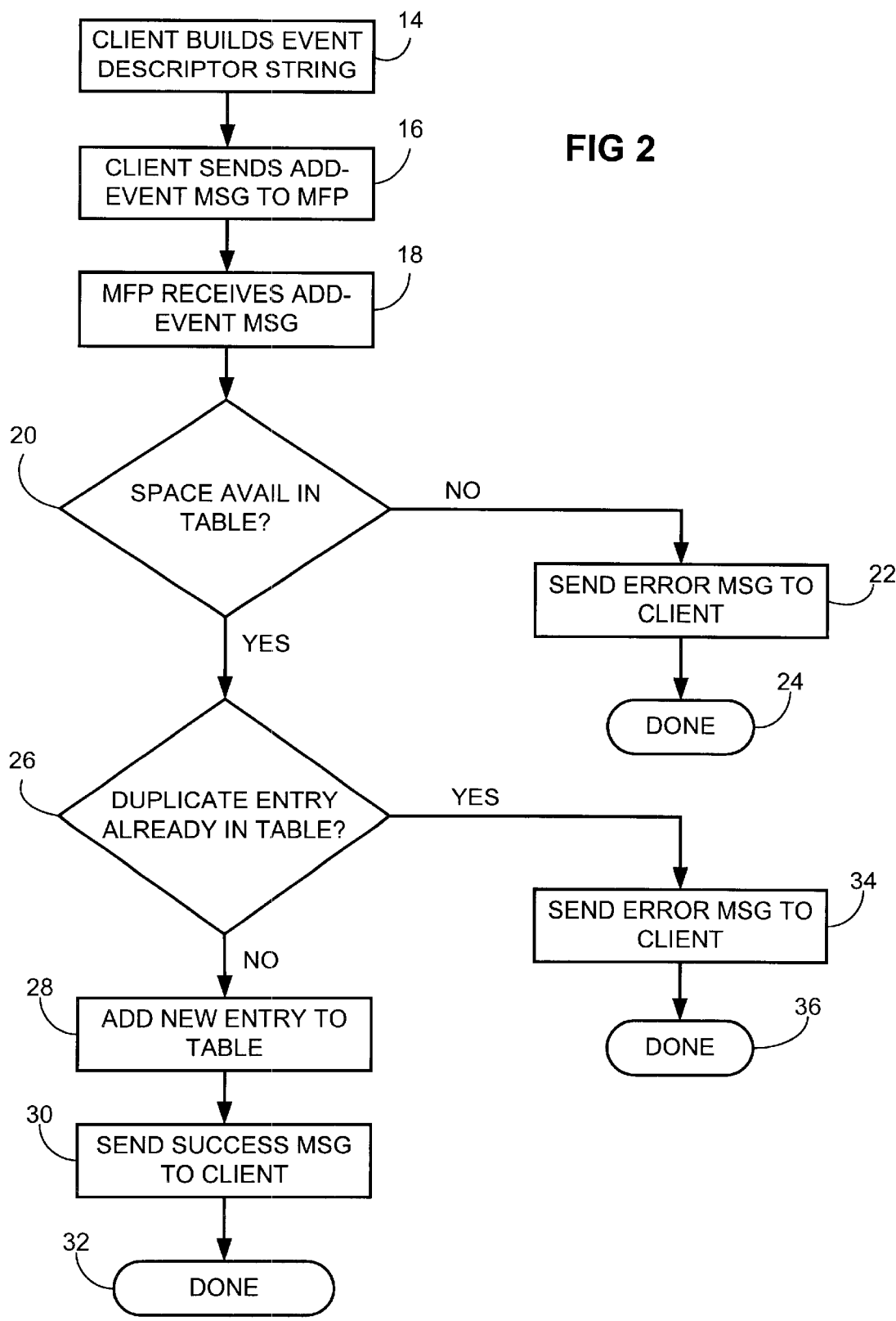
FIG. 2 is a flowchart illustrating the method for selectively adding entries to the table of event descriptors step of the present invention.

FIG. 2 shows the steps involved in which the MFP 10 provides the clients 12 a way to add an entry to the table. A user can send input material from the peripheral by having the client 12 add an entry to the table. For example, one way that the client 12 can add an entry is by using a software program located on the client. The client 12 will first construct an event descriptor string with all the information needed to complete an event message to be included in an add-event message (block 14). For example, the string might specify that the event is a scan and that the input data should be delivered to a word processor located on client 12. The client 12 then sends this add-event message to the MFP 10, requesting that the event be added (block 16). One way to send the add-event message, for example, is by using the Peripheral Management Language (PML) protocol to SET an ADD-ENTRY management object to direct the MFP 10 to add the entry to the table. It should be noted that this task may be accomplished by other protocols. It should also be noted that if there are more than one client 12 connected to the MFP 10, the MFP 10 must then keep track of which client 12 supplied each entry in order to send the add-event message back. After the MFP 10 received the add-event message from the client 12 (block 18), the MFP 10 checks for an available space in the table (block 20). If no available space exists in the table, the MFP 10 will send an error message to the client 12 (block 22), and concludes the subroutine (block 24). When a space is available in the table, the MFP 10 will try to determine whether there is a duplicate entry by trying to find the exact event descriptor string in the table (block 26). If a duplicate is not found, then the MFP 10 adds the new entry to the table (block 28). The MFP 10 next sends a success message to the client 12 as an indicator to the client of the successful completion of the input add-event message (block 30). This concludes the subroutine of adding entries to the table, and the MFP 10 returns to an idle state and waits for the next event message (block 32). On the other hand, an error message will be sent to the client 12 when a space is not available (block 34), and concludes the subroutine (block 36).

Figure 3:
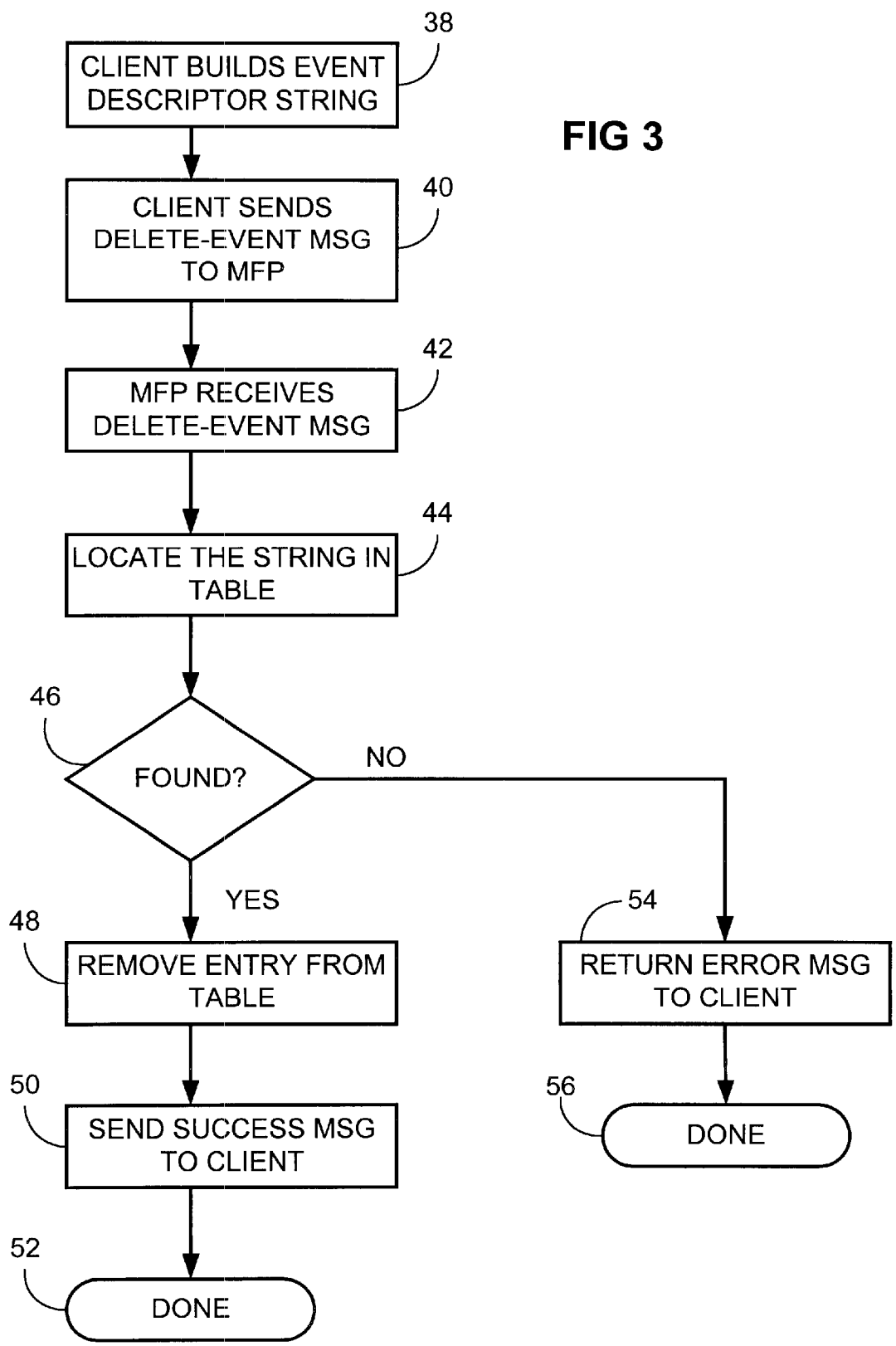
FIG. 3 is a flowchart illustrating the method for selectively deleting entries from the table of event descriptors step of the present invention.

Similarly, FIG. 3 shows the steps involved in which the MFP 10 provides the clients 12 a way to delete an entry from the table. When a user wants to terminate the use of a peripheral or wants to shut down the client 12 so that it can no longer process events, the client 12 will remove the entry or entries from the table. The client 12 will first construct an event descriptor string with the exact same string it added earlier to be included in an delete-event message (block 38). The client 12 then sends this delete-event message to the MFP 10, requesting that the event be deleted (block 40). This again can be accomplished, for example, by using the PML protocol to SET a DELETE-ENTRY management object directing the MFP 10 to delete the entry from the table. After the MFP 10 received the delete-event message from client 12 (block 42), the MFP 10 then tries to locate a match of both the string and the client 12 in the table (block 44). The MFP 10 determines if such a match was found (block 46). The MFP 10 accordingly removes the entry from the table if a match was found (block 48), and may then send a success message to client 12 as an indicator to the client of the successful completion of the input delete-event message (block 50). Again, the MFP 10 returns to an idle state and waits for the next event message since the subroutine of deleting entries from the table comes to a conclusion after the success message is sent (block 52). On the other hand, if the MFP 10 was unable to find a match in the table, an error message is sent to the client 12 (block 54). An additional step for the client 12 to display the error message to the user may be included to keep the user informed of the status (block 56).

Figure 4:
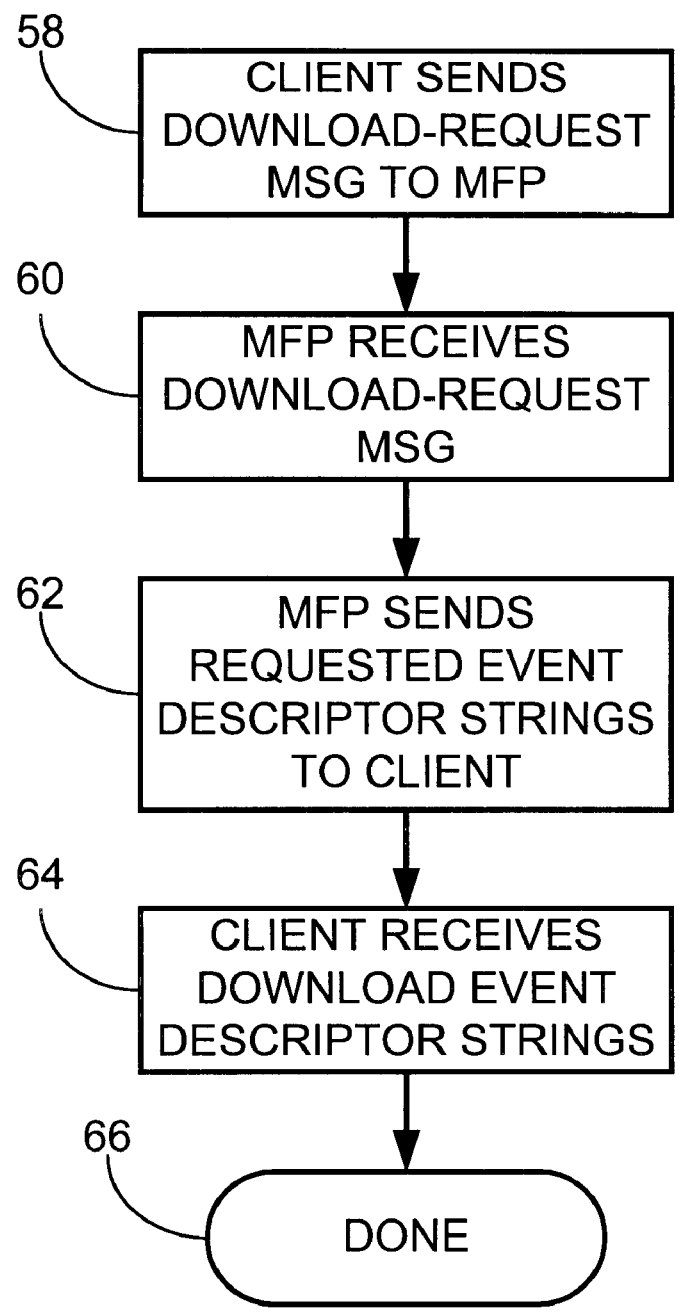
FIG. 4 is a flowchart illustrating the method for the client to download entries from the table of event descriptors.

FIG. 4 shows the steps involved in which the MFP 10 provides the clients 12 a way to download an entry or entries from the table. The client 12 first sends a download-request message to the MFP 10 (block 58). MFP 10 receives this download-request message (block 60), and accordingly sends the event descriptor strings for the requested download entries to the client 12 (block 62). After client 12 receives the download event descriptor strings (block 64), the subroutine is concluded (block 66).

Figure 5:
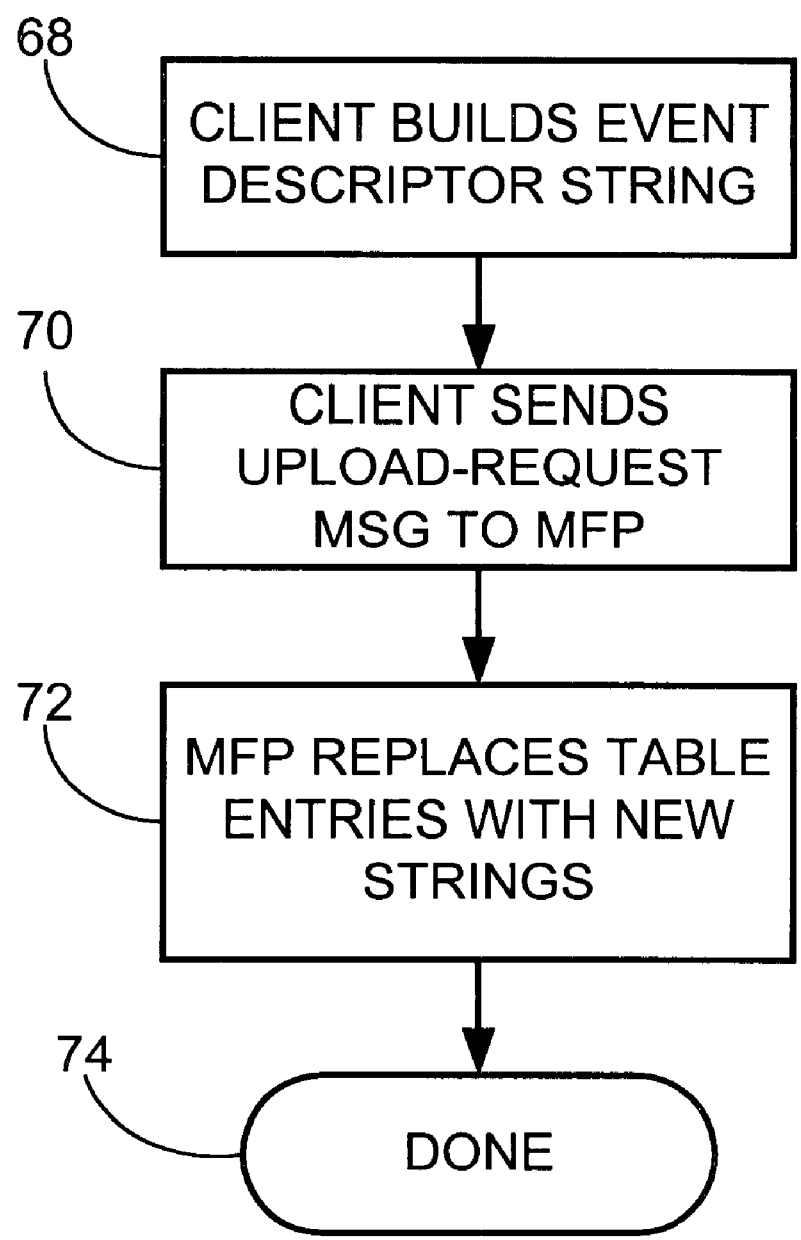
FIG. 5 is a flowchart illustrating the method for the client to upload entries to the table of event descriptors; and, FIG. 6 is a flowchart illustrating the method in which a user can select an entry from the table of event descriptors of the present invention.

FIG. 5 similarly shows the steps of the MFP 10 providing the clients 12 a way to upload an entry or entries to the table. This time, the client 12 builds the event descriptor string or strings for the upload request entry or entries, and the string is to be included in a downloaded-request message (block 68). The client next sends this upload-request message to the MFP 10 (block 70). The MFP replaces the table entries with the new event descriptor string as requested (block 72), and concludes this subroutine (block 74).

In accordance with another aspect of the present invention, FIG. 6 shows the steps involved in which the MFP 10 provides a user a way to select an entry from the table. The MFP 10 waits for the user to start the selection event process (block 76), which takes place when the user invokes an event selection mechanism on the MFP 10. For example, a scanner or a scan-capable MFP 10 might provide a "SCAN TO" button. When the user presses the button, the MFP 10 selects one entry from the table for display to the user. As a convenience to the user, it is more desirable to select the most recently used entry since this entry would most likely be the one that the user seeks. For example, each time the "SCAN TO" button is pressed, the MFP 10 advances to the next entry in the table and displays it to the user. In this case, the MFP 10 shows the "name" portion of the "DISPLAY=name" parameter in the string (block 78).

The client 12 then provides a way for the user to choose or input a name that easily identifies the entry to the user, and waits for an input from the user (block 80). The user may be given three choices for the input, specifically choices to move to next entry, select current entry, or cancel. If the user picks the choice to move to next entry, the MFP 10 shows the newly selected entry using the "DISPLAY=name" parameter in the string (block 82) and waits for a new user input (block 80). If the user chooses the input of cancel, the MFP 10 ignores the selection event process initiated earlier by the user (block 86), and concludes the select entry subroutine (block 88). When the user finally selects the entry, the MFP 10 sends the selection-event message with the complete event descriptor string necessary to execute the event back to the client 12 (block 90). The MFP 10 stores this entry as the most recently used entry as an update for next time (block 92). The client 12 receives and acknowledges the selection-event message as required by the underlying messaging protocol, such as the PML protocol. In the case of the PML protocol, a PML TRAP-REPLY message is sent by the client 12. The client 12 then executes the selection-event message, specifically executing the action indicated by the complete event string that was added to the selection-event message (block 66). After the execution, the subroutine of selecting the entry is completed (block 68).

From the foregoing description, it should be understood that an improved method for communicating event messages between at least client operatively connected a peripheral device has been shown and described which has many desirable attributes and advantages. The method adapts an input peripheral device to enable the user in completing the entire input task at the peripheral device, rather than dividing parts of the task between the peripheral device and the clients.

While various embodiments of the present invention has been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A method for communicating an event message between at least one client operatively connected to a peripheral device, the peripheral device being adapted to execute an event when selected by a client or a user, said method comprising the steps of:

maintaining a table of event descriptors in the peripheral device;

selectively adding entries to said table of event descriptors in response to receiving a preselected add event descriptor request from a connected client;

selectively deleting entries from said table of event descriptors in response to receiving a preselected delete event descriptor request from a connected client; and, a user selecting an entry from said table of event descriptors for executing the selected event.

2. The method according to claim 1 wherein each entry contained in said table of event descriptors is a string of characters constituting a list of parameters needed for at least one client to execute the event message, each parameter is constructed as a keyword that names the parameter and an associated value defining the parameter, and each parameter is separated with a semi-colon character.

3. The method according to claim 1 wherein said selectively adding entries step further comprises the steps of:

the client constructing an event descriptor string including all the information needed to complete the event message for an add-event message;

the client sending said add-event message to the peripheral device;

the peripheral device receiving said add-event message;

the peripheral device sending an error message to client if the table is full; and, the peripheral device locating the exact event descriptor string in the table of event descriptors if the table is not full.

4. The method according to claim 3 wherein said step of the peripheral device locating the exact event descriptor string further comprises the step of:

sending an error message to client if the exact event descriptor string is found; and, adding the new entry to said table of event descriptors if the exact event descriptor string is not found.

5. The method according to claim 4, wherein said step of said step adding the new entry further comprises the step of sending a success message back to the client.

6. The method according to claim 1 wherein said selectively adding entries step further comprises the steps of:

the client sending a download-request message to peripheral device;

the peripheral device receiving said download-request message;

the peripheral device sending the download event descriptor strings with the requested download entries from said table of event descriptor to client; and, the client receiving the downloaded event descriptor strings.

7. The method according to claim 1 wherein said selectively adding entries step further comprises the steps of:

the client builds event descriptor string for an upload-request message;

the client sends said upload-request message to peripheral device; and, the peripheral device replacing event descriptor strings in said table of event descriptor with the requested download-request entries.

8. The method according to claim 1, wherein said selectively deleting entries step further comprises steps of:

the client constructing an event descriptor string including the exact event string added earlier for a delete-event message;

the client sending said delete-event message to the peripheral device;

the peripheral device receiving said delete-event message;

the peripheral device locating the exact event descriptor string in said table of event descriptors;

the peripheral device removing the entry from said table of event descriptors if said exact event string is found; and, the peripheral device sending an error message to the client if said exact event string is not found.

9. The method according to claim 8, wherein said step of the peripheral device removing the entry from said table further comprises the step of the peripheral device sending a success message back to the client.

10. The method according to claim 1 wherein said selectively deleting entries step further comprises the steps of:

the client sending a download-request message to peripheral device;

the peripheral device receiving said download-request message;

the peripheral device sending the download event descriptor strings with the requested download entries from said table of event descriptor to client; and, the client receiving the downloaded event descriptor strings.

11. The method according to claim 1, wherein said selectively deleting entries step further comprises steps of:

the client builds event descriptor string for an upload-request message;

the client sends said upload-request message to peripheral device; and, the peripheral device replacing event descriptor strings in said table of event descriptor with the requested download-request entries.

12. The method according to claim 1, wherein said step of a user selecting an entry further comprises the steps of:

the user initiating a selection event process;

the peripheral device displaying a most recently used name in the "DISPLAY=name" parameter contained within the entry descriptor string;

the client providing a means to allow users to input a name of the entry; and, the peripheral device responding to said input name of the entry from the client.

13. The method of claim 12, wherein said step of the peripheral device responding to said input name of the entry further comprises steps of:

the peripheral device displaying the newly selected entry if user moves to next entry;

the peripheral device ignoring said selection event process if user selects cancel; and, the peripheral device sending said selection-event message with the complete event descriptor string back to the client if user selects an entry.

14. The method of claim 13, wherein said step of the peripheral device sending said selection-event message with the complete event descriptor string back to the client further comprises the steps of:

the peripheral device storing the selected entry as the most recently used entry; and, the client executing said selection-event message.

15. A method for communicating an event message between at least one client operatively connected to a peripheral device, the peripheral device being adapted to respond a request when selected by a client or a user, said method comprising the steps of:

selectively sending event descriptor strings from a table of event descriptors in response to receiving an download-request message from a connected client; and, selectively replacing event descriptor strings from said table of event descriptors in response to receiving a upload-request message from a connected client.

16. The method according to claim 15, wherein said step of selectively sending event descriptor strings further comprises the steps of:

the client sending a download-request message to peripheral device;

the peripheral device receiving said download-request message;

the peripheral device sending the download event descriptor strings with the requested download entries from said table of event descriptor to client; and, the client receiving the downloaded event descriptor strings.

17. The method according to claim 15, wherein said step of selectively replacing event descriptor strings further comprises the steps of:

the client builds event descriptor string for an upload-request message;

the client sends said upload-request message to peripheral device; and, the peripheral device replacing event descriptor strings in said table of event descriptor with the requested download-request entries.

18. A system for enabling the execution of events by a peripheral device, wherein the events are defined by selective event messages and wherein event messages can be requested by a user and at least one client operatively connected to the peripheral device, said system comprising:

means for maintaining a table of event descriptors in the peripheral device;

means in the connected client for selectively generating preselected add event descriptor requests for adding entries to said table of event descriptors;

means in the connected client for selectively generating preselected delete event descriptor requests for deleting entries from said table of event descriptors; and, a user selecting an entry from said table of event descriptors for executing the selected event.

19. A system for enabling the execution of events by a peripheral device, wherein the events are defined by selective request messages and wherein request messages can be initiated by at least one client operatively connected to the peripheral device, said system comprising:

means in the connected client for selectively generating preselected download-request for receiving entries from a table of event descriptors; and, means in the connected client for selectively generating preselected upload-request for replacing entries to said table of event descriptors.

20. A system for enabling the execution of events by a peripheral device, wherein the events are defined by selective event messages and wherein event messages can be requested by a user and at least one client operatively connected to the peripheral device, said system comprising:

the peripheral device maintaining a table of event descriptors;

the connected client being adapted to selectively generate preselected add event descriptor requests for adding entries to said table of event descriptors;

the connected client being adapted to selectively generate preselected delete event descriptor requests for deleting entries from said table of event descriptors; and, the peripheral device being adapted to enable a user to select an entry from said table of event descriptors for executing the selected event.

21. A system for enabling the execution of events by a peripheral device, wherein the events are defined by selective event messages and wherein event messages can be requested by a user and at least one client operatively connected to the peripheral device, said system comprising:

the connected client being adapted to selectively generating preselected download-request for receiving entries from a table of event descriptors; and, the connected client being adapted to connected client for selectively generating preselected upload-request for replacing entries to said table of event descriptors.

* * * * *